United States Patent [19]
Brion et al.

[11] Patent Number: 4,680,671
[45] Date of Patent: Jul. 14, 1987

[54] HIGH VOLTAGE AND HIGH ENERGY STORAGE DEVICE AND A PULSE GENERATOR INCLUDING THE APPLICATION THEREOF

[75] Inventors: Jean-Claude A. Brion, Ormoy la Riviere; Claude Brunaud, Ver sur Mer; Robert P. H. Jean, Gregy sur Yerres; René H. Machet, Jouy le Moutier, all of France

[73] Assignee: Societe de Verrerie et de Thermometrie, Paris, France

[21] Appl. No.: 729,411

[22] Filed: May 1, 1985

[30] Foreign Application Priority Data

May 2, 1984 [FR] France ................................ 84 06814

[51] Int. Cl.$^4$ ........................ H01G 4/38; H05B 37/00
[52] U.S. Cl. ................................ 361/329; 315/227 R
[58] Field of Search .............. 361/328, 329, 272, 278, 361/307, 309

[56] References Cited

U.S. PATENT DOCUMENTS

| | | | |
|---|---|---|---|
| 3,214,658 | 10/1965 | Linson | 361/329 X |
| 3,302,082 | 1/1967 | Preissinger | 361/329 |
| 3,559,007 | 1/1971 | Blank | 361/329 |

FOREIGN PATENT DOCUMENTS

| | | |
|---|---|---|
| 1338786 | 8/1963 | France . |
| 713605 | 1/1954 | United Kingdom . |

OTHER PUBLICATIONS

Proceedings from the 10th Modulator Symposium, New York, U.S., May 21-22, 1968, pp. 274-294, J. J. Moriarty et al.: "Megavolt Modulators for Nanosecond Radar", pp. 284-285.

Japanese Journal of Applied Physics, vol. 20, No. 12, Dec. 1981, pp. 2397-2400, Tokyo, Japan; Y. Kubota et al.: "Study of the Rectangular-Like Output Waveforms of a 720 Kv Coaxial Marx Generator", FIG. 2.

IEEE Transactions of Plasma Science, vol. PS-8, No. 3, Sep. 1980, pp. 167-170, IEEE, New York, U.S.; W. R. Rapoport et al.: "KrF Laser-Triggered SF6 Spark Gap for Low Jitter Timing", FIG. 2.

*Primary Examiner*—Donald A. Griffin
*Attorney, Agent, or Firm*—Wenderoth, Lind & Ponack

[57] ABSTRACT

A high voltage and high energy device for storing energy, comprising storage elements (4) disposed in concentric ring arrangements on insulating separating elements (5), the storage elements of one ring arrangement being connected by one of their ends to the storage elements of the preceding ring arrangement, and by their other end to the storage elements of the following ring arrangement, the assembly being mounted on a core of hard insulating material provided with a central bore and being embedded in a coating of semi-flexible material.

16 Claims, 12 Drawing Figures

HIGH VOLTAGE AND HIGH ENERGY STORAGE DEVICE AND A PULSE GENERATOR INCLUDING THE APPLICATION THEREOF

BACKGROUND OF THE INVENTION

1. Field of the Invention

The present invention relates to the storage of electric energy at a high voltage in a limited volume. It mainly concerns compact pulse generators having a high stored energy density per unit volume, these generators being constructed according to the principle of the Marx generator having a line discharge or a capacitive discharge.

Marx generators employ components (resistors, capacitors, lines having localized or distributed constants, spark gaps) which are mechanically and electrically assembled.

2. Description of the Prior Art

Owing to their geometrical shapes, the elements, ensuring the storage of the energy while generally having an interesting energy density, do not permit the employment of all the useful internal space of the generator for the storage of the energy.

In these known devices, the spark gaps are independent and pressurized and the electrodes are maintained in an insulating and sealed frame. The use of pressurized sealed spark gaps increases the difficulties of construction of the generator and its cost. The fact that the spark gaps are independent requires the triggering of the first spark gaps of the generator.

The dielectric rigidity required for the correct operation of the generators is ensured by an insulating gas or a high voltage oil. The presence of the high voltage oil results in an increase in the weight, the volume (storage tank) and the price of the generator (filtering, storage, pumping system and price of the oil). Further, the servicing operations are long and not easy to accomplish.

Consequently, the known high voltage pulse generators have the following drawbacks:
- low energy storage density per unit weight and volume;
- difficulty in constructing and high cost in manufacturing the spark gaps;
- necessity of triggering several of the spark gaps;
- long, delicate and costly servicing operations.

An object of the invention is therefore to overcome the drawbacks of high voltage pulse generators by providing a generator which, owing to an extreme integration of its components, has a high energy density per unit weight and volume.

The invention therefore provides an energy storage device having a high voltage and high energy, said device comprising storage elements disposed in concentric ring arrangements on insulating separating elements, the storage elements of one ring arrangement being connected by one of their ends to the storage elements of the preceding ring arrangement and by their other end to the storage elements of the following ring arrangement, the assembly being mounted on a core of hard insulating material provided with a central bore and embedded in a coating of semi-flexible insulating material.

The invention also provides a high voltage and high energy pulse generator comprising energy storage devices of the type defined hereinbefore and resistors associated with said storage devices embedded in the semi-flexible insulating coating material.

BRIEF DESCRIPTION OF THE DRAWINGS

A better understanding of the invention will be had from the following description which is given solely by way of example with reference to the accompanying drawings in which:

FIGS. 11 and 12 show an assembly of capacitors according to the invention used in the construction of a high voltage pulse generator such as a Marx generator.

DESCRIPTION OF THE PREFERRED EMBODIMENTS

Figure 1:
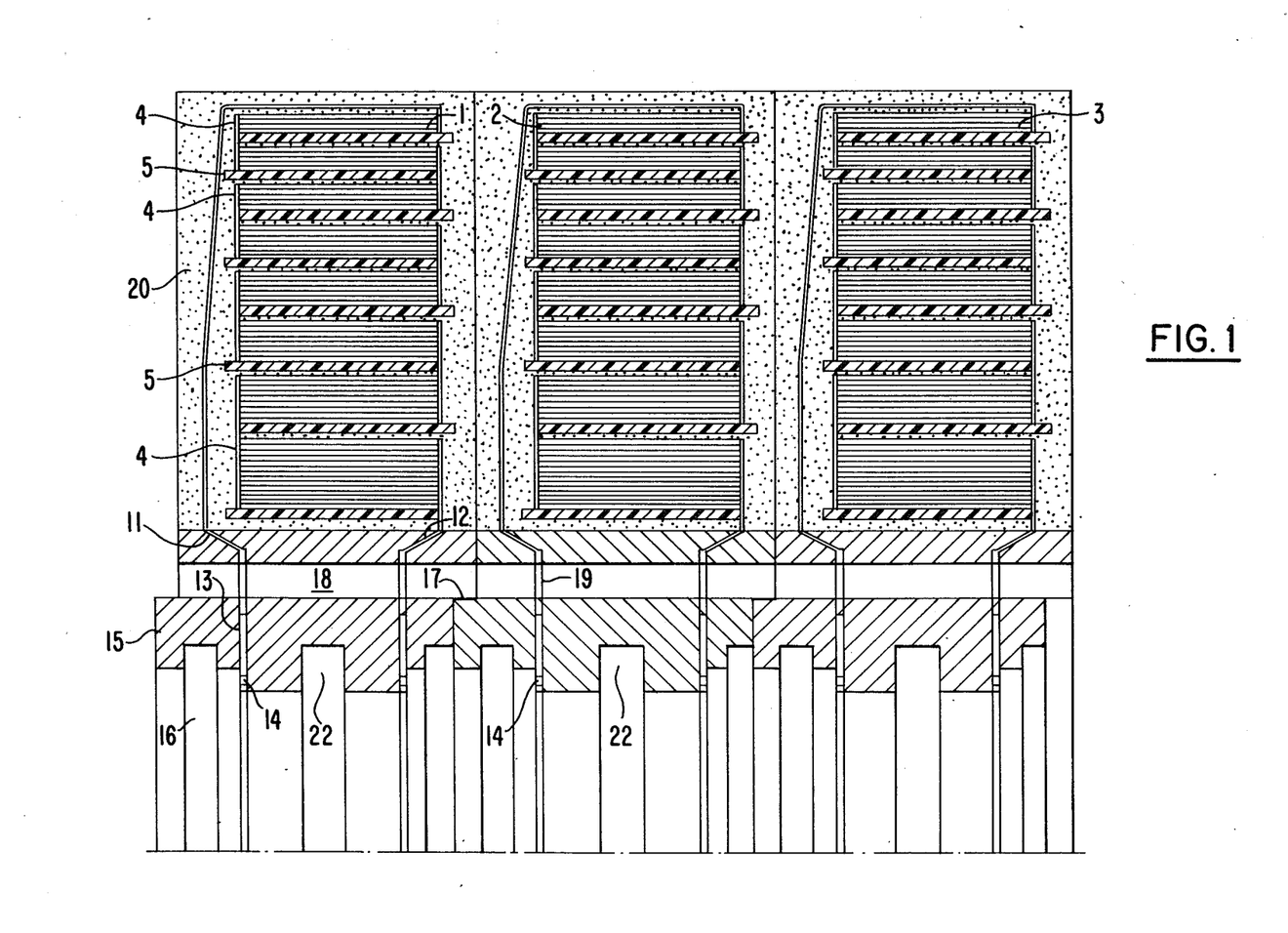
FIG. 1 is a semi-diametrical view of an assembly of high voltage and high energy density capacitors according to the present invention.

Such an assembly consists of a plurality of stages 1, 2, 3.

The number and the construction of the capacitors are chosen so as to optimize the energy density as a function of the characteristics of utilization, such as the operating voltage, the reverse voltage, the peak current, the duration of the discharge, and the duration of life.

Each capacitor is constructed in the form of individual concentric ring structures 4 formed by the winding of ribbons constituted, in the known manner, by conductive bands and films of dielectric material wound on an insulating mandrel 5 formed by a filamentary winding.

The mandrels 5 are disposed in such manner that every other mandrel axially projects relative to an opposite side of the elementary capacitor.

With such an arrangement, it is possible to connect the plate of one ring 4 to the plate of the following ring to progressively achieve a series connection of all the rings 4 so as to constitute the elementary capacitor.

In order to achieve this series connection, the sides of the rings 4 are schooped and a thin copper ring is applied against the schooped sides of two consecutive rings 4 separated by a mandrel 5 whose end is flush with the rings on these sides.

Figure 2:
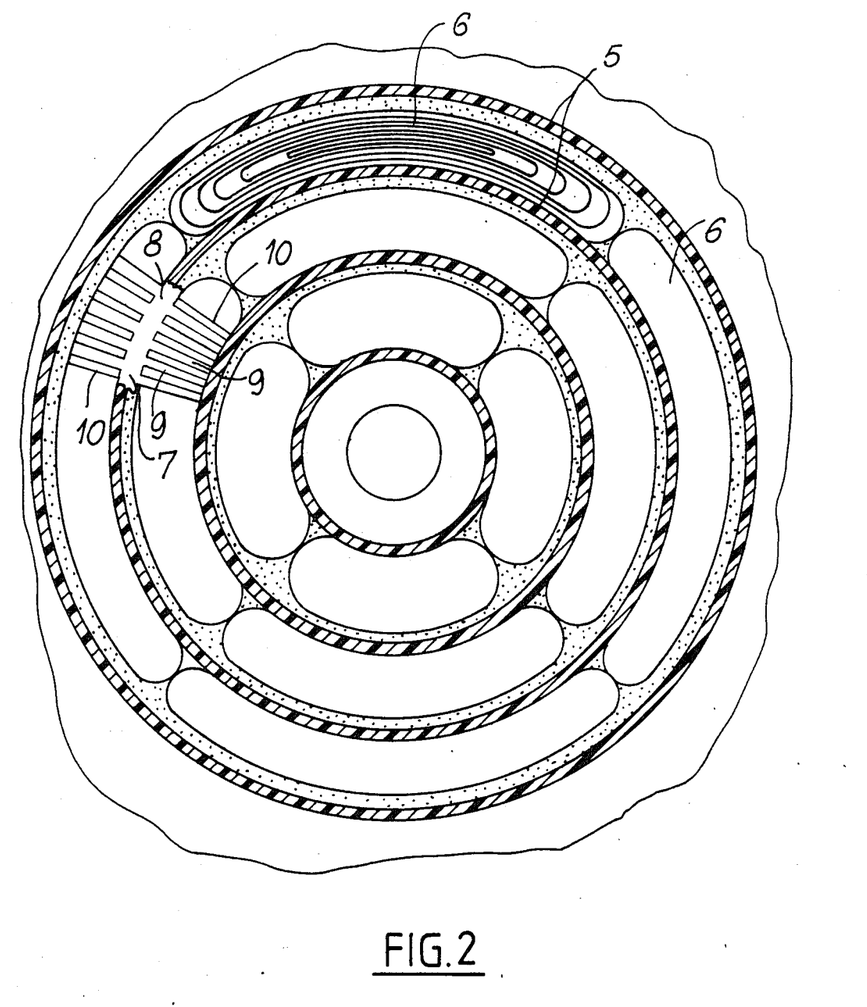
FIG. 2 is a cross-sectional view of another embodiment of a capacitor according to the present invention.

Such a manner of connecting is shown in FIG. 2 which represents a capacitor having a design which is slightly different from that of the capacitor shown in FIG. 1.

As can be seen in FIG. 2, the plates of the capacitor, instead of being wound concentrically on the mandrels 5, are formed by a winding 6 which is first wound in a cylindrical shape and is then flattened so as to constitute segments of a cylinder. The compactors are then placed in side-by-side relation around the insulating mandrels.

After the the sides of the windings are schooped, connecting means comprising copper rings, such as the rings 7, are disposed on the consecutive rows of windings.

Each ring 7 comprises an annular web 8 disposed against the end of the corresponding separating mandrel. Extending from the web 8 and on each side of the latter are strips 9 evenly spaced apart.

The notches 10 formed between the strips 9 are filled with solder when the connecting ring 7 is fixed to the windings 6.

It will be understood that similar connecting rings are employed in the capacitor shown in FIG. 1.

With reference again to FIG. 1, it can be seen that the end terminals 11, 12 of the assembly are both constructed in a similar manner.

The terminals 11,12 are then soldered to thicker rings of brass 13 employed for connecting exterior power circuits to the capacitor.

The brass rings 13, which are provided with tapped openings 14, are mounted in a core 15 of hard resin provided with a central bore 16 adapted to receive certain components of the pulse generator of which the capacitor must be a part.

Furthermore, the cores 15 are provided with shouldered centering ledges 17 and axial apertures 18 extend therethrough for receiving screwthreaded assembling rods of insulating material, for example of resin with a glass fiber filler, adapted to fix the various capacitors together.

The brass rings 13 are also provided with openings 19 through which said assembling rods also extend.

Each capacitor is obtained by moulding operations carried out under a vacuum, the capacitor being previously impregnated, if desired.

The mandrels 5 and the windings 4 are embedded in a coating 20 of semi-flexible resin which is adapted to absorb the electromechanical shocks occurring during the operation of the capacitors.

The hard resin of the core 15 and the semi-flexible resin of the coating 20 are respectively advantageously formed by a polyurethane resin, Damival 13-517, and by a polyurethane resin, Damival 13-521, manufactured and sold by the firm Alsthom.

Each capacitor is then machined so as to finish the centering shoulders 17.

In the bore 16 of each core 15 there are notches 22 for ensuring the lengthening of the electric field lines.

The hard and semi-flexible resins of the core 15 and of the coating 20 are chosen in accordance with their dielectric qualities and their compatibility (mutual adherence).

The capacitors described with reference to FIGS. 1 and 2 are respectively constructed from concentric ring elements (FIG. 1) and flat elements arranged in a concentric configuration (FIG. 2).

In the embodiment shown in FIG. 2, the successive layers of elements have radial joint planes. They may also have offset joint planes.

The insulating mandrels 5 may be replaced by separating elements formed by, for example, thick sheets of semi-flexible resin.

There may also be constructed in accordance with an arrangement similar to that shown in FIG. 2, very high voltage and low value capacitors termed peak capacitors.

Such a capacitor, whose number of elements depends on the utilization voltage, will now be described with reference to FIGS. 3 to 5.

Figure 3:
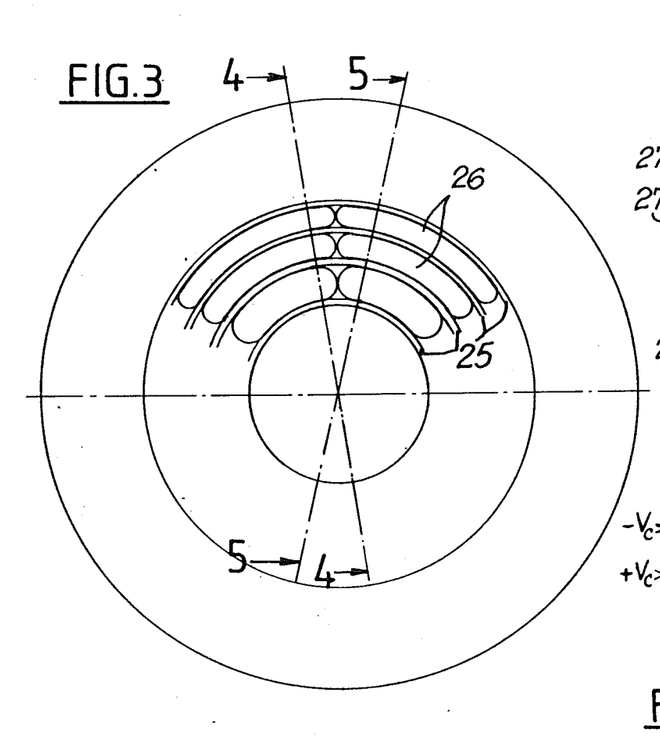
FIG. 3 is an end elevational view of a modification, having a low value and very high voltage, of the capacitor according to the present invention.

The capacitor shown in FIG. 3 is made in a manner similar to that of the capacitor shown in FIG. 2.

It comprises insulating mandrels 25 around which are disposed flattened windings 26 placed in concentric rings. The mandrels 25 are offset in the same way as those of the capacitor shown in FIG. 1.

Figure 4:
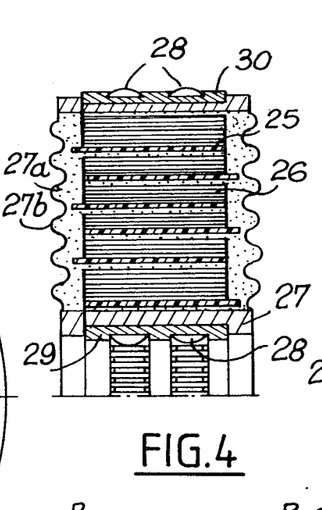
FIGS. 4 and 5 are respectively semi-diametrical views taken along lines 4—4 and 5—5 of FIG. 3.
Figure 5:
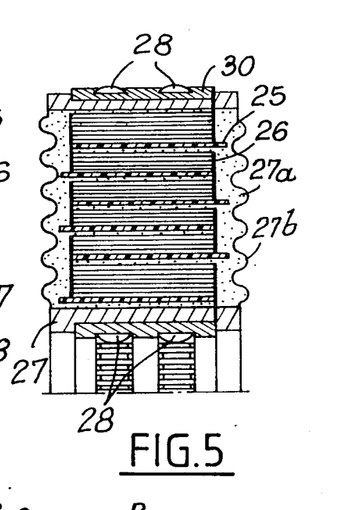

As can be seen particularly in FIGS. 4 and 5, one of the plates of the capacitor no longer leads into the core 27. The connection is achieved on the outside diameter of the ring.

The end connections are provided with contact strips 28 disposed on the periphery of a ring 29 inside the core 27 and on the periphery of a ring 30 outside the assembly, these rings being made from brass or aluminium.

The coating of semi-flexible material of these capacitors has ends provided with corrugations 27b adapted to lengthen the field lines.

The use of flat elementary capacitors enables the self-inductance of the capacitor to be reduced by employing alternating connections on the adjoining elementary capacitors of the same layer, as can be seen clearly in FIGS. 4 and 5.

Figure 6:
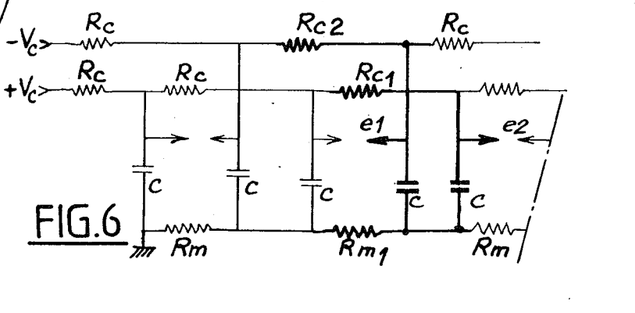
FIG. 6 is an electric diagram showing the construction of a Marx generator.

The diagram of FIG. 6 shows a stage of a symmetrical Marx generator which is shown by a line which is thicker than the rest of the circuit.

This stage comprises a charging resistor $R_{c2}$ supplied with a negative voltage $-V_c$ connected in series with a plate of a capacitor C connected to an electrode of a spark gap $E_1$, the other plate of this capacitor being connected to a resistor $R_{m1}$. Another resistor $R_{c1}$ supplied with a positive voltage $+V_c$ is connected in series with a plate of another capacitor C connected to an electrode of another spark gap $E_2$, the other plate of this capacitor being connected to the aforementioned resistor $R_{m1}$.

The stages of the Marx generator are all constructed in the same way.

FIGS. 7 to 10 show an embodiment of a Marx generator constructed by means of capacitors of the type described hereinbefore in accordance with the diagram of FIG. 6.

Figure 7:
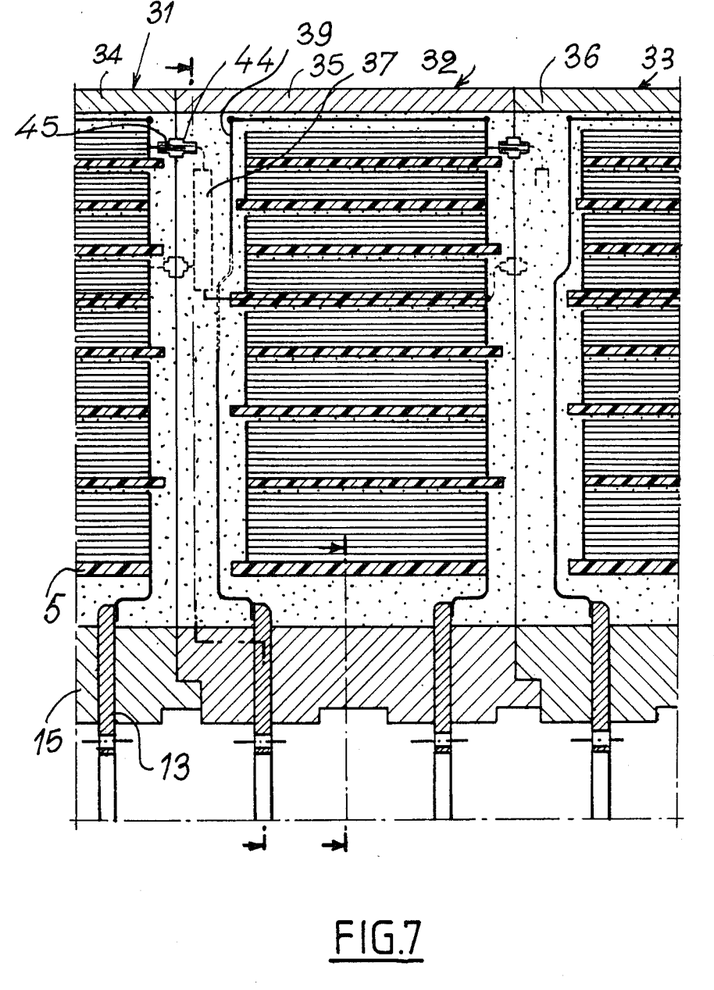
FIG. 7 is a partial semi-diametrical view of a pulse generator constructed with an assembly of capacitors according to the present invention in accordance with the diagram of FIG. 6.

This generator, which is of the symmetrical type, comprises an assembly of capacitors 31, 32, 33 similar to those described with reference to FIG. 1 or 2, disposed in outer casings 34, 35, 36 of hard resin.

Figure 8:
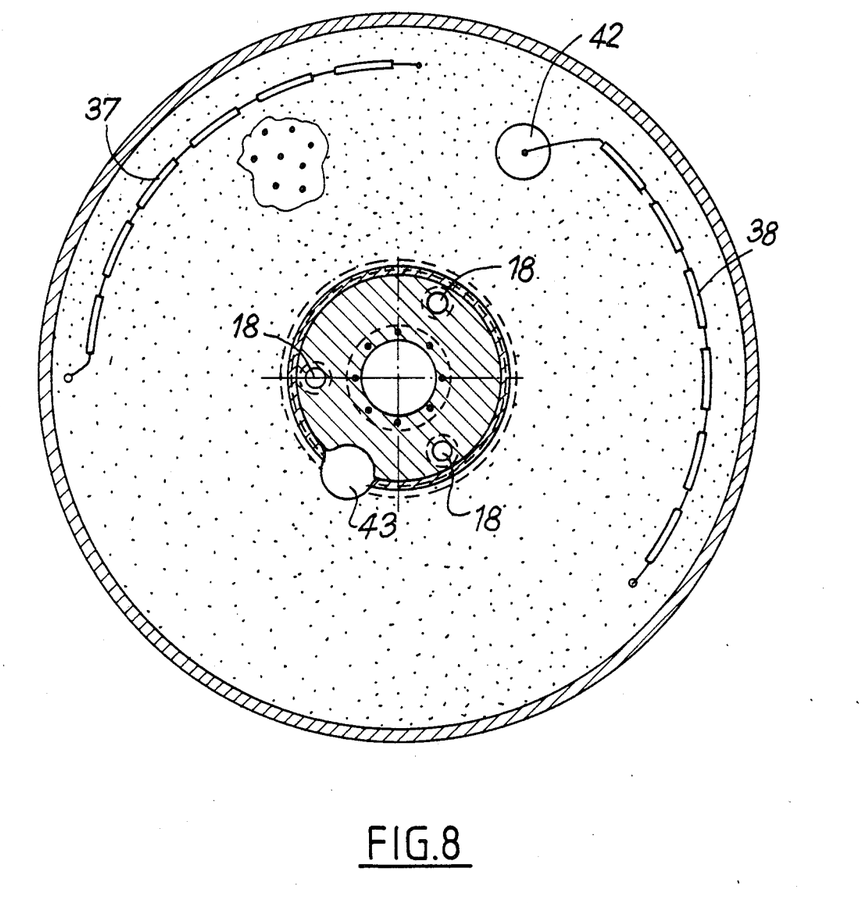
FIG. 8 is a cross-sectional view in a smaller scale of a stage of the generator shown in FIG. 7.
Figure 9:
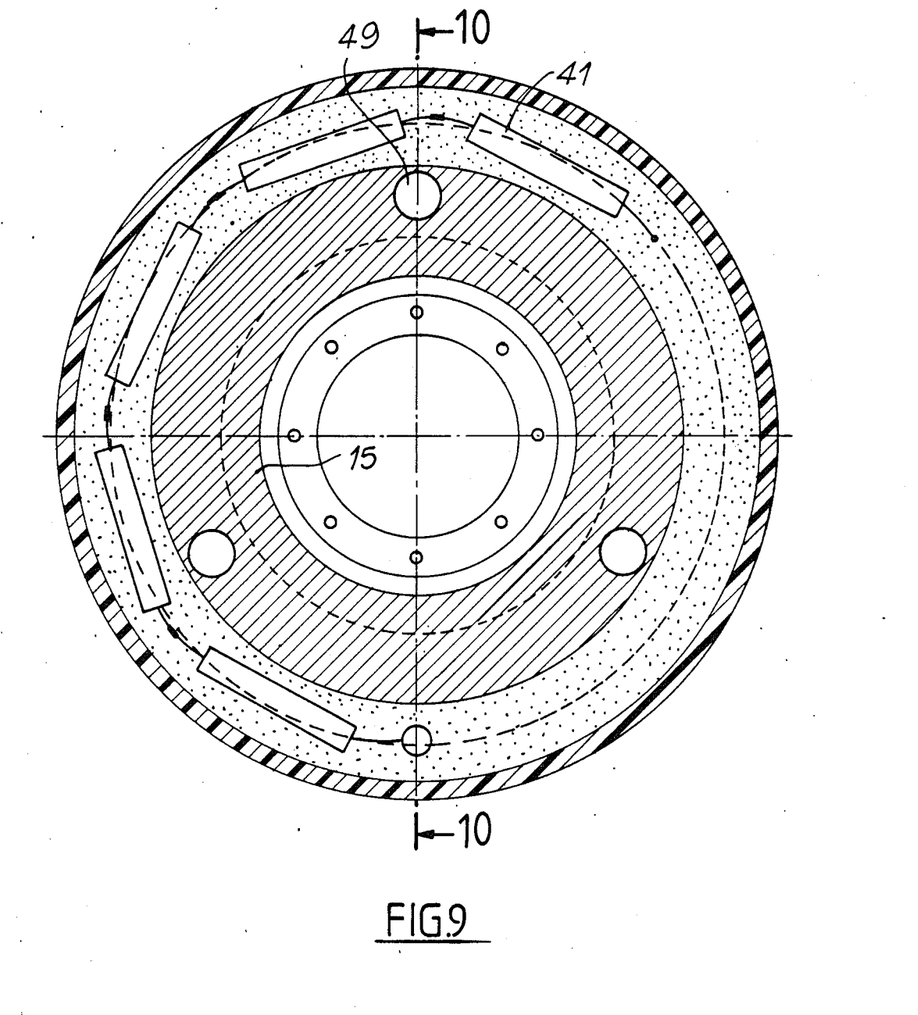
FIG. 9 is a cross-sectional view in an enlarged scale of the central part of the generator shown in FIG. 8.

The Marx generator comprises charging resistors 37, 38 which are, in the embodiment shown in FIGS. 7, 8 and 9, six in number. These resistors 37 are connected in series, as are the resistors 38.

The ring forming the connection 39 connecting one plate of each capacitor to a corresponding brass ring 13 (FIG. 7) is adapted to permit the placement of resistors $R_{C1}$ 37 and $R_{C2}$ 38. The resistor $R_{M1}$ embodied by the resistors 41, is disposed in the central part of the device between the first mandrel 5 and the hard resin core 15. Two cavities 42 and 43 in the connecting ring provide a passage for the connections between the resistors $R_{M1}$ 41 and $R_{C1}$ 37, on one hand, and the preceding stage, on the other.

The connection between the stages 34, 35, 36 are achieved by means of brass insert 44 receiving plugs having two rows of contact strips 45.

The spark gap electrodes 46 (FIG. 10) are fixed to the rings 13 by means of screws engaged in tapped openings 47 or by any other system. The arrangement of the rings 13 permits a linear arrangement of the spark gaps which provides the advantage of promoting their cascade triggering by means of an axial laser beam 48 or ultraviolet radiation emitted upon the triggering of the spark gaps of the preceding stages.

The casings 34, 35, 36 of the stages of the generator are advantageously made from hard resin which allows the stages to have good geometric dimensions which facilitate the positioning of each stage inside the generator.

Figure 10:
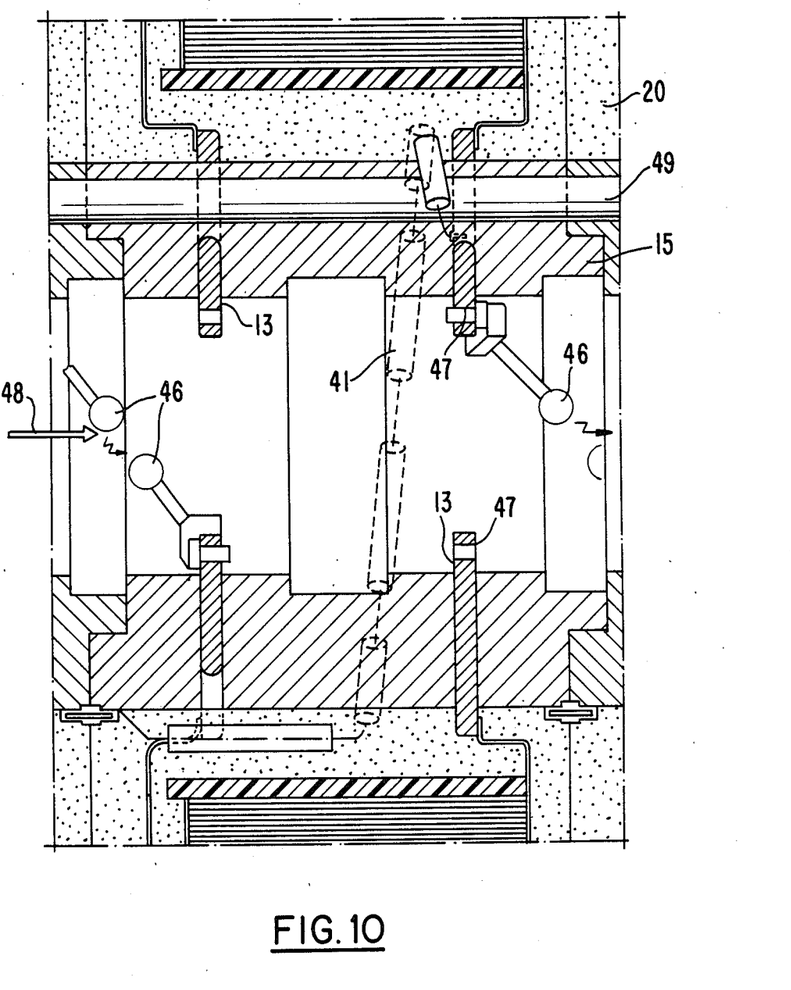
FIG. 10 is a sectional view taken along line 10—10 of FIG. 9.

FIG. 10 shows a mechanical connection between the successive stages achieved by screwthreaded rods 49, fabricated from resin having a glass fiber fillers disposed in the openings 18.

The pulse generator described with reference to FIGS. 7 to 10 is a generator in which the energy storage devices are capacitors. A high voltage and high energy pulse generator may also be constructed in which the energy storage devices are formed by transmission lines arranged in a manner similar to that described for the capacitors, except for their connections which are achieved at the ends of each storage element forming the energy storage device.

The arrangement just described sets forth pulse generators having the following advantages:
- an increase in the energy density
- line spark gaps which may be actuated by luminous radiation;
- an absence of the requirement for a fluid tight frame
- a possibility of simply using auxiliary triggering electrodes with their series of resistors and
- easy and rapid servicing.

The generators according to the invention have a reduced overall size so that they may be easily transported and carried on a craft.

We claim:

1. A high voltage and high energy storage device for storing energy, said storage device comprising:
   - an annular assembly surrounding a central core of hard insulating material having an axial central bore extending therethrough,
   - said assembly comprising a plurality of concentric ring structures having first and second sides, each of said plurality of ring structures being respectively disposed around an insulating separating element for electrically insulating the respective said ring structure disposed therearound from a concentrically adjacent said ring structure,
   - each of said ring structures comprising a plurality of flat energy storage elements disposed side-by-side in a cylindrical arrangement around said respective insulating separating element, each of said energy storage elements comprising wound electrically conductive bands covered by a film of dielectric material;
   - connecting means for electrically connecting said first sides of respective ones of said ring structures to a said ring structure that is disposed concentrically adjacent and inward toward said core from said respective ones of said ring structures and for connecting said second sides of respective ones of said ring structures to a said ring structure that is disposed concentrically adjacent and outward from said core from said respective ones of said ring structures; and
   - a coating of semi-flexible material covering said assembly.

2. A storage device as claimed in claim 1, wherein each of said separating elements is an insulating mandrel comprising a filamentary winding.

3. A storage device as claimed in claim 1, wherein said energy storage elements are capacitors; and
   said connecting means comprises a plurality of copper rings each of which extends around one of said first and said second sides of said plurality of ring structures between concentrically adjacent said ring structures for electrically connecting each of said capacitors of a respective ring structure to the capacitors of a concentrically adjacent ring structure,
   each of said copper rings having an annular web and strips radially extending from opposite sides of said annular web, said strips extending from one side of said web being in electrically contact with said capacitors of one of said concentrically adjacent ring structures and said strips extending from the other side of said web in electrical contact with said capacitors of the other of said concentrically adjacent ring structures, said strips extending from said annular web being spaced apart from each other on each side of said web respectively thereby defining a plurality of notches between said spaced apart strips, and assembly metal in said plurality of notches attaching each of said copper rings to said concentrically adjacent ring structures.

4. A storage device as claimed in claim 1, and further comprising two electrically conductive rings in said core; and
   said connecting means is connected to said conductive rings for electrically connecting said assembly to said conductive rings.

5. A storage device as claimed in claim 1, and further comprising an electrically conductive ring in said core and an electrically conductive ring extending around the outside of said assembly, said electrically conductive rings having contact strips attached thereto; and
   said connecting means is connected to said electrically conductive rings for electrically connecting said assembly to said conducting rings.

6. A storage device as claimed in claim 1, wherein said energy storage elements are capacitors and each of said ring structures comprises the same number of capacitors;
   said connecting means connects said capacitors of said respective ones of said ring structures to corresponding capacitors in said concentrically adjacent ring structures; and
   further comprising an electrically conductive ring in said core electrically connected to said connecting means, and an electrically conductive ring extending around the outside of said assembly and electrically connected to said connecting means, said conductive rings each having contact strips attached thereto.

7. A storage device as claimed in claim 1, wherein said storage elements are transmission lines connected to said connecting means at respective ends thereof.

8. An energy storage unit comprising:
   a plurality of high energy storage devices, each of said high energy storage devices comprising an annular assembly surrounding a central core of hard insulating material, said central core having an axial central bore extending therethrough, at least one axial opening extending therethrough and spaced from said central bore, and a central positioning and centering means for positioning and centering adjacent ones of said plurality of high energy storage devices relative to one another, said assembly comprising a plurality of concentric ring structures having first and second sides, each of said plurality of ring structures comprising at least one energy storage element being disposed around a respective insulating separating element for electrically insulating the respective said ring structure disposed therearound from a concentrically adjacent said ring structure;

connecting means for electrically connecting said first sides of respective ones of said ring structures to a said ring structure that is disposed concentrically adjacent and inward toward said core from said respective ones of said ring structures and for connecting said second sides of respective ones of said ring structures to a said ring structure that is disposed concentrically adjacent and outward from said core from said respective ones of said ring structures;

a coating of semi-flexible material covering said assembly; and said at least one axial opening extending through each of said high energy storage devices being aligned with one another, and a threaded rod comprising electrically insulative material extending through said aligned axial openings of said plurality of high energy storage devices.

9. An energy storage unit as claimed in claim 8, wherein each of said ring structures comprises one energy storage element having concentric windings of electrically conductive bands covered with films of dielectric material which extend around the respective said separating elements.

10. An energy storage unit as claimed in claim 8, wherein each of said ring structures comprises a plurality of energy storage elements disposed side-by-side in a cylindrical arrangement around said respective insulating separating element, each of said energy storage elements comprising flat wound electrically conductive bands covered by a film of dielectric material.

11. An energy storage unit as claimed in claim 8, wherein each of said separating elements is an insulating mandrel comprising a filamentary winding.

12. An energy storage unit as claimed in claim 8, wherein said at least one energy storage element is at least one capacitor; and said connecting means comprises a plurality of copper rings each of which extends around one of said first and said second sides of said plurality of ring structures between concentrically adjacent said ring structures for electrically connecting said at least one capacitor of a respective ring structure to the at least one capacitor of a concentrically adjacent ring structure, each of said copper rings having an annular web and strips radially extending from opposite sides of said annular web, said strips extending from one side of said web being in electrically contact with said at least one capacitor of one of said concentrically adjacent ring structures and said strips extending from the other side of said web in electrical contact with said at least one capacitor of the other of said concentrically adjacent ring structures, said strips extending from said annular web being spaced apart from each other on each side of said web respectively thereby defining a plurality of notches between said spaced apart strips, and assembly metal in said plurality of notches attaching each of said copper rings to said concentrically adjacent ring structures.

13. An energy storage unit as claimed in claim 8, and further comprising two electrically conductive rings in said core of each of said plurality of high energy storage devices, said connecting means of each of said plurality of high energy storage devices connected to said conductive rings respectively for electrically connecting said assemblies of said plurality of high energy storage devices to said conductive rings.

14. An energy storage device as claimed in claim 8, and further comprising an electrically conductive ring in each of said cores of said plurality of high energy storage devices, and an electrically conductive ring extending around said assemblies of said plurality of high energy storage devices, said conductive rings having contact strips attached thereto; and said connecting means connected to said conductive rings respectively for electrically connecting said assemblies to said conductive rings.

15. An energy storage unit as claimed in claim 8, wherein said at least one energy storage element is a plurality of capacitors of said and each of said ring structures comprises the same number of capacitors;

said connecting means connects said capacitors of said respective ones of said ring structures to corresponding capacitors in said concentrically adjacent ring structures; and further comprising an electrically conductive ring in each of said cores of said plurality of high energy storage devices electrically connected to said connecting means, and an electrically conductive ring extending around the outside of said assemblies of said plurality of high energy storage devices and electrically connected to said connecting means, said conductive rings each having contact strips attached thereto.

16. An energy storage unit as claimed in claim 8, wherein said at least one storage element of said ring structures are transmission lines connected to said connecting means at respective ends thereof.

* * * * *